United States Patent
Vollenberg et al.

(10) Patent No.: US 10,851,235 B2
(45) Date of Patent: Dec. 1, 2020

(54) SCRATCH-RESISTANT PMMA AND POLYCARBONATE SILOXANE COPOLYMER COMPOSITIONS

(71) Applicant: SABIC GLOBAL TECHNOLOGIES B.V., Bergen op Zoom (NL)

(72) Inventors: Peter Vollenberg, Mount Vernon, IN (US); Christopher Luke Hein, Mount Vernon, IN (US); Hao Zhou, Mount Vernon, IN (US); Mark Van Der Mee, Bergen op Zoom (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/851,331

(22) Filed: Apr. 17, 2020

(65) Prior Publication Data
US 2020/0339797 A1  Oct. 29, 2020

(30) Foreign Application Priority Data
Apr. 26, 2019 (EP) .................................... 19171281

(51) Int. Cl.
*C08L 33/12* (2006.01)
*C08L 69/00* (2006.01)
*C08L 83/04* (2006.01)

(52) U.S. Cl.
CPC .............. *C08L 33/12* (2013.01); *C08L 69/00* (2013.01); *C08L 83/04* (2013.01); *C08L 2201/10* (2013.01); *C08L 2203/16* (2013.01)

(58) Field of Classification Search
CPC .......... C08L 33/12; C08L 69/00; C08L 83/10
See application file for complete search history.

(56) References Cited

U.S. PATENT DOCUMENTS

| 4,478,981 | A | 10/1984 | Arkles |
| 4,745,029 | A | 5/1988 | Kambour |
| 2009/0124749 | A1* | 5/2009 | Steendam ............... C08L 33/10 524/502 |
| 2010/0280180 | A1 | 11/2010 | Lee et al. |
| 2014/0370213 | A1* | 12/2014 | van der Mee .......... C08L 69/00 428/35.7 |
| 2018/0030259 | A1 | 2/2018 | Somasundaram et al. |

* cited by examiner

*Primary Examiner* — Vu A Nguyen
(74) *Attorney, Agent, or Firm* — BakerHostetler

(57) ABSTRACT

Thermoplastic compositions include: from about 62 wt % to about 99 wt % poly(methyl methacrylate) (PMMA) or copolymers thereof; and from about 1 wt % to about 38 wt % of a poly(carbonate-siloxane) copolymer having a siloxane content of from about 25 wt % to about 45 wt %. The compositions are scratch resistant. Scratch resistance may be determined as comprising a scratch depth of less than 20 micron (μm) as measured in accordance with the Erichsen scratch hardness test at a force of 4 Newton (N). Articles including the thermoplastic composition are also described.

15 Claims, 2 Drawing Sheets

SCRATCH-RESISTANT PMMA AND POLYCARBONATE SILOXANE COPOLYMER COMPOSITIONS

CROSS-REFERENCE TO RELATED APPLICATIONS

This application claims priority to European Application No. 19171281.9, filed Apr. 26, 2019, the disclosure of which is incorporated herein by this reference in its entirety.

FIELD OF THE DISCLOSURE

The present disclosure relates to scratch-resistant thermoplastic compositions including poly(methyl methacrylate) and polycarbonate-siloxane copolymers.

BACKGROUND OF THE DISCLOSURE

Polymethyl methacrylate (PMMA) has been a material of choice for scratch resistant and transparent or high gloss black thermoplastic compositions, but due to its low impact strength it cannot be positioned in demanding applications like many automotive interior or exterior parts or consumer electronics housings. Polycarbonate (PC) has excellent impact strength and transparency, but in its basic form (Bisphenol-A polycarbonate homopolymer) it lacks scratch resistance. The Durabio™ polymers (Mitsubishi) are alleged to combine some of the advantageous properties of PC and those of PMMA.

One effective technology to improve scratch resistance is hard-coating. While such coatings are used whenever required, it adds an expensive secondary operation to the part manufacturing process and thus less preferred.

A number of anti-scratch additives have been marketed. It is believed that they may be effective because they have limited compatibility with the polymer matrix material and are therefore located more predominantly at the surface of the matrix. At least two types of additives have been used: "slippery" additives such as fatty-acid based chemicals or siloxanes; and solid hard particle technologies.

TenasiTech has developed anti-scratch additives for use with nylon, polyester, acrylic and other resins. The additives are compounded into the resins. It is claimed that no hard-coating of molded parts is needed for scratch and mar resistance. Their product line consists of two versions:

SOLID-FS™ for PMMA, nylons, PET for high gloss applications. Recommended for processing up to 220° C. This additive is said to have limited or no negative effects on optical properties and to be effective at very low loadings in polymers, typically 0.25% weight.

SOLID-HT™ for Polycarbonate, PMMA and other resins, recommended for processing up to 300° C.

Evonik offers anti-scratch additives for polyolefins as well as for technical polymers like PA, PMMA or PC/ABS. Chemically, TEGOMER® AntiScratch additives are organic modified siloxanes.

There exists a need for scratch-resistant PMMA compositions with improved impact strength that do not require a hard coating or scratch-resistant additives. These and other shortcomings are addressed by aspects of the disclosure.

SUMMARY

Aspects of the disclosure relate to thermoplastic compositions including: from about 62 wt % to about 99 wt % poly(methyl methacrylate) (PMMA) or copolymers thereof; and from about 1 wt % to about 38 wt % of a poly(carbonate-siloxane) copolymer having a siloxane content of from about 25 wt % to about 45 wt %. The compositions are scratch resistant. Scratch resistance may be determined as comprising a scratch depth of less than 20 micron (μm) as measured in accordance with the Erichsen scratch hardness test at a force of 4 Newton (N).

Aspects of the disclosure further relate to articles including the thermoplastic composition.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

DETAILED DESCRIPTION

Figure 1:
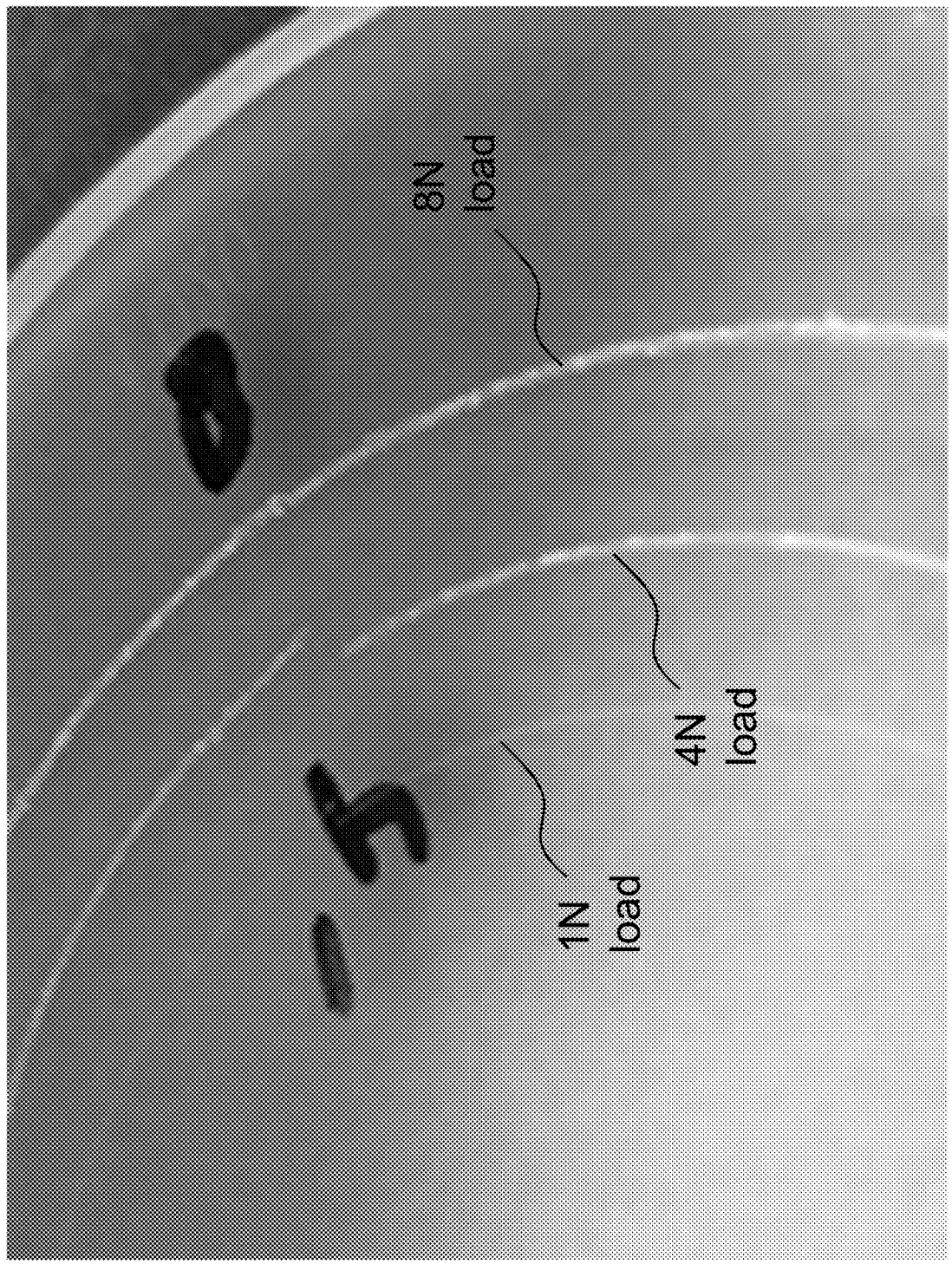
FIG. 1 is an image showing results from the Erichsen scratch resistance test method at varying loads.

In various aspects, the present disclosure relates to scratch-resistant thermoplastic compositions including from about 56 wt % to about 81 wt % poly(methyl methacrylate) (PMMA) and from about 19 wt % to about 44 wt % of a poly(carbonate-siloxane) copolymer having a siloxane content of from about 25 wt % to about 45 wt %.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein "Si content" or "X % Si" refers to the siloxane content of the component (e.g., the PC—Si copolymer) or composition.

As used in the specification and the appended claims, the singular forms "a," "an" and "the" include plural referents unless the context clearly dictates otherwise. Thus, for example, reference to "a poly(methyl methacrylate)" includes compositions including two or more poly(methyl methacrylates).

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Scratch-Resistant Thermoplastic Compositions

Aspects of the disclosure relate to a thermoplastic composition including: from about 56 wt % to about 81 wt % poly(methyl methacrylate) (PMMA); and from about 19 wt % to about 44 wt % of a poly(carbonate-siloxane) copolymer having a siloxane content of from about 25 wt % to about 45 wt %. The composition is scratch resistant.

PMMA

Any suitable PMMA polymer or copolymer may be used in the composition. Exemplary PMMA polymers include, but are not limited to, Acrylite® POQ66 available from Evonik, Plexiglas® V920A available from Arkema, and combinations thereof.

Poly(Carbonate-Siloxane Copolymer)

The poly(carbonate-siloxane) copolymers include carbonate units and siloxane units. Suitable carbonate units are shown in formula (1)

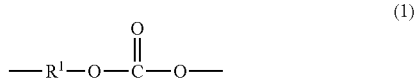

wherein at least 60 percent of the total number of R groups is aromatic, or each R contains at least one $C_{6-30}$ aromatic group. A combination of different $R^1$ groups can be present. The carbonate units can be derived from a dihydroxy compound such as an aromatic dihydroxy compound of formula (2) or a bisphenol of formula (3)

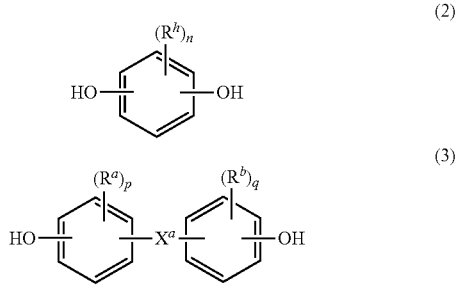

wherein in formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other aspects in formula (2), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)— wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination including different diphenol compounds can be used.

Examples of bisphenols (3) include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. A combination including different bisphenol compounds can be used.

Specific dihydroxy compounds include resorcinol, 2,2-bis(4-hydroxyphenyl) propane (bisphenol A or BPA), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In an aspect of formula (2), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In more preferred aspect, the bisphenol polycarbonate is a bisphenol A polycarbonate homopolymer, also referred to as bisphenol A homopolycarbonate, which has repeating structural carbonate units of formula (1a).

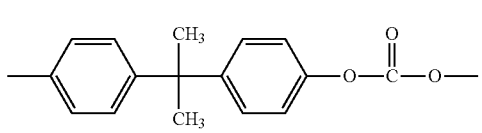
(1a)

Such linear homopolymers containing bisphenol A carbonate units (BPA-PC) include those commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC.

The siloxane units (also referred to as polysiloxane blocks) are optionally of formula (4)

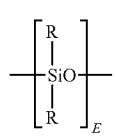
(4)

wherein each R is independently a $C_{1-13}$ monovalent organic group. For example, R can be a $C_{1-13}$ alkyl, $C-C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) copolymer is desired, R is unsubstituted by halogen. A combination of the foregoing R groups can be used in the same poly(carbonate-siloxane) copolymer.

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, each R is independently methyl, trifluoromethyl, or phenyl.

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 100 or 10 to 50, and in still another aspect, E has an average value of 40 to 100, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (5)

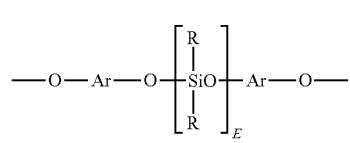
(5)

wherein E is as defined for formula (4); each R can be the same or different, and is as defined for formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (6a) and (6b)

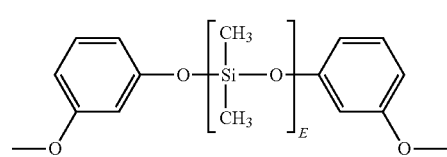
(6a)

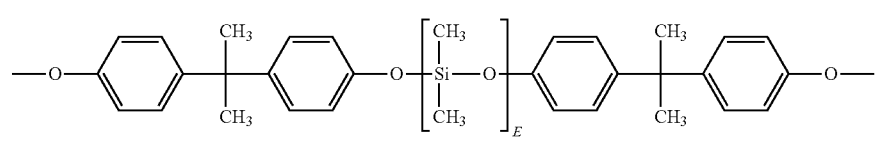
(6b)

wherein E is as described in Formula (4). In an aspect, E has an average value of 10 to 80 or 10 to 40, and in still another aspect, E has an average value of 40 to 80, or 40 to 70.

In another aspect, the siloxane units are of formula (7)

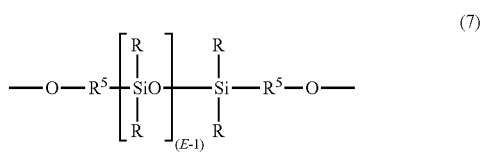

(7)

wherein R and E are as described for formula (4), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (8):

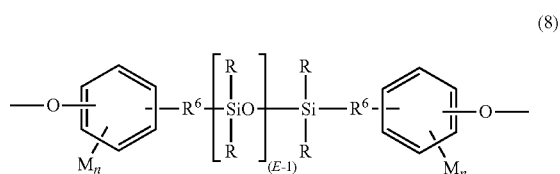

(8)

wherein R and E are as defined for formula (5). $R^6$ in formula (8) is a divalent $C_{2-8}$ aliphatic group. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an aspect in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (8), R is methyl, or a combination of methyl and trifluoropropyl, or a combination of methyl and phenyl. In still another aspect in formula (8), R is methyl, M is methoxy, n is one, and $R^6$ is a divalent $C_{1-3}$ aliphatic group. Preferred polydiorganosiloxane blocks are of the formulas

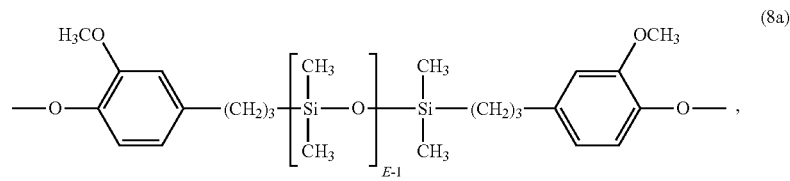

(8a)

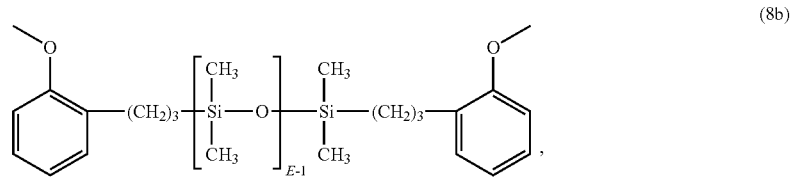

(8b)

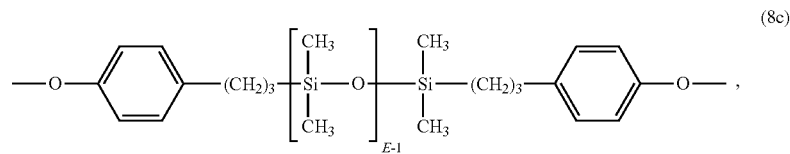

(8c)

or a combination thereof, wherein E has an average value of 10 to 100, preferably 20 to 60, more preferably 30 to 50, or 40 to 50.

In an aspect, the poly(carbonate-siloxane) copolymer includes carbonate units derived from bisphenol A, and repeating siloxane units (8a), (8b), (8c), or a combination thereof (preferably of formula 7a), wherein E has an average value of E has an average value of 10 to 100, or 20 to 60, or 30 to 60, or 40 to 60. In an aspect, the poly(carbonate-siloxane) copolymers include carbonate units derived from bisphenol A and repeating siloxane units of formula (8a) (8b), or (8c), wherein E has an average value of 10 to 100, or 20 to 60, or 30 to 50, or 40 to 50.

The poly(carbonate-siloxane) copolymer can have a siloxane content of 25 to 45 wt %, or about 40 wt %, based on the total weight of the poly(carbonate-siloxane) copolymer. As used herein, "siloxane content" of the poly(carbonate-siloxane) copolymer means the content of siloxane units based on the total weight of the poly(siloxane-carbonate). The poly(carbonate-siloxane) copolymer can have a weight average molecular weight of 26,000 to 45,000 Da, or 30,000 to 43,000 Da, or 35,000 to 40,000 Da as measured by gel permeation chromatography using a crosslinked styrene-divinyl benzene column, at a sample concentration of 1 milligram per milliliter, and as calibrated with bisphenol A polycarbonate standards. In other aspects, the poly(carbonate-siloxane) copolymer can have a weight average molecular weight of 10,000 to 100,000 Da, or 50,000 to 100,000 Da.

While any suitable poly(carbonate-siloxane) copolymer may be used in the thermoplastic composition, in a particular aspect the poly(carbonate-siloxane) copolymer is ML7698, available from SABIC.

As noted, the thermoplastic composition has 62 wt % to about 99 wt % poly(methyl methacrylate) (PMMA) or copolymers thereof and from about 1 wt % to about 38 wt % of the poly(carbonate-siloxane) copolymer. In particular aspects the composition includes from about 1 wt % to about 18 wt % of the poly(carbonate-siloxane) copolymer. In further aspects the composition includes from about 23 wt % to about 38 wt % of the poly(carbonate-siloxane) copolymer. Compositions including this range of poly(carbonate-siloxane) copolymer may provide a particularly desirable balance of scratch resistance and mechanical properties.

Properties

In some aspects the thermoplastic composition—including films/articles formed therefrom—has a transmittance of at least 70% as measured in accordance with ASTM D1003.

As noted, the thermoplastic composition is scratch resistant. In certain aspects scratch resistance is evaluated according to the Erichsen scratch hardness test, which is described in more detail in the Examples below. In some aspects scratch resistance is determined as comprising a scratch depth of less than 20 micron (μm) as measured in accordance with the Erichsen scratch hardness test at a force of 4 Newton (N). In further aspects scratch resistance is determined as comprising a scratch depth of less than 5 μm as measured in accordance with the Erichsen scratch hardness test at a force of 4N.

In some aspects the thermoplastic composition has improved mechanical properties. In particular, the composition may have a notched Izod impact strength at 23° C., as measured in accordance with ASTM D256 and ASTM D4812, that is at least 200% higher than that of a substantially identical reference composition comprising PMMA instead of the poly(carbonate-siloxane) copolymer. In other aspects the composition has a notched Izod impact strength at 23° C., as measured in accordance with ASTM D256 and ASTM D4812, that is at least 250% higher, or at least 300% higher, or at least 350% higher, than that of a substantially identical reference composition comprising PMMA instead of the poly(carbonate-siloxane) copolymer.

As used herein, a "substantially identical reference composition" is a composition that includes the same components, and the same amounts of the components, as the example composition, except that the reference composition does not include the recited component (e.g., the poly (carbonate-siloxane) copolymer is omitted). Where one component is removed, the wt % of the removed component is added to the primary polymer in the composition. Thus, if an example composition includes 59 wt % PMMA, 39 wt % poly(carbonate-siloxane) copolymer and 2 wt % other components, a substantially identical reference composition that does not include the poly(carbonate-siloxane) copolymer includes 98 wt % PMMA and 2 wt % of the same other components as the example composition.

In further aspects the composition has a tensile elongation at break, as measured in accordance with ASTM D638, that is at least 350% higher than that of a substantially identical reference composition comprising PMMA instead of the poly(carbonate-siloxane) copolymer. In certain aspects composition has a tensile elongation at break, as measured in accordance with ASTM D638, that is at least 400% higher, or at least 450% higher, or at least 500% higher, or at least 600% higher, or at least 700% higher, than that of a substantially identical reference composition comprising PMMA instead of the poly(carbonate-siloxane) copolymer.

In some aspects the composition has a transparency of at least about 75%. In other aspects the composition has a transparency of at least about 80%, or at least about 85%. The composition may also be colorable. In particular aspects the composition the color is high gloss black or piano black.

Additives

In some aspects the thermoplastic composition further includes one or more additional additives. The one or more additional additives may include, but are not limited to, scratch-resistance agents, fillers, pigments, whitening agents, optical brighteners, surfactants, processing aids, thermal/heat stabilizers, ultraviolet (UV) stabilizers, and photochemical stabilizers. In particular, the thermoplastic composition may further include one or more scratch-resistance agents such as but not limited to the TenasiTech and Evonik materials described herein.

Exemplary UV stabilizers suitable for use in aspects of the disclosure include, but are not limited to, hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl) benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers.

Exemplary heat stabilizers suitable for use in aspects of the disclosure include, but are not limited to, hindered phenols and organophosphites such as tris-(2,6-dimethylphenyl)phosphite, tris-(mixed mono- and di-nonylphenyl) phosphite or the like; phosphonates such as dimethylbenzene phosphonate or the like or combinations thereof.

Methods for Making the Thermoplastic Composition

The one or any foregoing components described herein may be first dry blended with each other, or dry blended with any combination of foregoing components, then fed into an extruder from one or multi-feeders, or separately fed into an extruder from one or multi-feeders. The fillers used in the invention may also be first processed into a masterbatch, then fed into an extruder. The components may be fed into the extruder from a throat hopper or any side feeders.

The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the polycarbonate has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles Including the Thermoplastic Composition

Aspects of the disclosure also relate to articles including the thermoplastic composition described herein. In some aspects the article is a film, a sheet, a molded article, a welded article, a filament or a powder.

In one example, the composition is incorporated into a film. Specifically, the film may include at least one film layer that includes the thermoplastic composition. In further aspects the film includes at least a second film layer. The second film layer may include a scratch-resistant hard coat. Other film layers may include other materials.

In particular aspects the article is an automotive component or a component of a consumer product. Example articles include, but are not limited to, exterior automobile components (grill, mirror housing, pillar, spoiler, logo, roof rail, bezel, trim, fender, etc.), interior automobile components (decorative parts, electronic housings, instrument panel components, navigation system, housing frames, etc.), storage boxes, furniture, appliance housings (e.g., robot cleaners, drones, etc.), and consumer electronics devices (e.g., device housings or components for laptops, phones, tablets, batteries, wireless charging, AR/VR goggles, etc.). Exemplary multilayer articles include but are not limited to a cap-layer in sheet, a top-layer or an intermediate layer in a multi-layer assembly (e.g., for electronics, photovoltaics, (O)LED), film for insert molding or in-mold decoration, top-layer for composite, etc.).

In some aspects the article is at least one of an automotive bumper, an automotive exterior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a window or a component thereof, a construction equipment vehicle or device part, a marine or personal water craft part, an all terrain vehicle or all terrain vehicle part, plumbing equipment, a valve or pump, an air conditioning heating or cooling part, a furnace or heat pump part, a computer housing, a computer housing or business machine housing or part, a housing or part for monitors, a computer router, a desk top printer, a large office/industrial printer, an electronics part, a projector part, an electronic display part, a copier part, a scanner part, an electronic printer toner cartridge, a handheld electronic device housing, a housing for a handheld device, a hair drier, an iron, a coffee maker, a toaster, a washing machine or washing machine part, a microwave, an oven, a power tool, an electric component, an electric enclosure, a lighting part, a component for a lighting fixture, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a component for a medical application or a device, an electrical box or enclosure, and an electrical connector, a construction or agricultural equipment, and a turbine blade.

In further aspects the article is a component of an aircraft interior or a train interior, an access panel, access door, air flow regulator, air gasper, air grille, arm rest, baggage storage door, balcony component, cabinet wall, ceiling panel, door pull, door handle, duct housing, enclosure for an electronic device, equipment housing, equipment panel, floor panel, food cart, food tray, galley surface, handle, housing for television, light panel, magazine rack, telephone housing, partition, part for trolley cart, seat back, seat component, railing component, seat housing, shelve, side wall, speaker housing, storage compartment, storage housing, toilet seat, tray table, tray, trim panel, window molding, window slide, a balcony component, baluster, ceiling panel, cover for a life vest, cover for a storage bin, dust cover for a window, layer of an electrochromic device, lens for a television, electronic display, gauge, or instrument panel, light cover, light diffuser, light tube, light pipes, mirror, partition, railing, refrigerator door, shower door, sink bowl, trolley cart container, trolley cart side panel, or window.

In yet further aspects the article is at least one of an automotive bumper, an automotive exterior component, an automobile mirror housing, an automobile grille, an automobile pillar, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a construction or agricultural equipment grille, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, a hand held electronic device enclosure or part, a wearable electronic device, a hand held tool enclosure or part, a smart phone enclosure or part, a mouse cover, and a turbine blade.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising:
from about 62 wt % to about 99 wt % poly(methyl methacrylate) (PMMA) or copolymers thereof; and
from about 1 wt % to about 38 wt % of a poly(carbonate-siloxane) copolymer having a siloxane content of from about 25 wt % to about 45 wt %,
wherein the composition is scratch resistant.

Aspect 2. The thermoplastic composition according to Aspect 1, wherein the poly(carbonate-siloxane) copolymer has a siloxane content of about 40 wt %.

Aspect 3. The thermoplastic composition according to Aspect 1 or 2, wherein the composition has a transmittance of at least 70% as measured in accordance with ASTM D1003.

Aspect 4. The thermoplastic composition according to any of Aspects 1 to 3, wherein the scratch resistance is determined as comprising a scratch depth of less than 20 micron (μm) as measured in accordance with the Erichsen scratch hardness test at a force of 4 Newton (N).

Aspect 5. The thermoplastic composition according to any of Aspects 1 to 4, wherein the composition comprises from about 82 wt % to about 99 wt % PMMA and from about 1 wt % to about 18 wt % poly(carbonate-siloxane) copolymer, and wherein the scratch resistance is determined as comprising a scratch depth of less than 5 μm as measured in accordance with the Erichsen scratch hardness test at a force of 4N.

Aspect 6. The thermoplastic composition according to any of Aspects 1 to 4, wherein the composition comprises from about 62 wt % to about 77 wt % PMMA or copolymers thereof and from about 23 wt % to about 38 wt % poly(carbonate-siloxane) copolymer.

Aspect 7. The thermoplastic composition according to any of Aspects 1 to 6, wherein the composition has a notched Izod impact strength at 23° C., as measured in accordance with ASTM D256 and ASTM D4812, that is at least 200% higher than that of a substantially identical reference composition comprising PMMA instead of the poly(carbonate-siloxane) copolymer.

Aspect 8. The thermoplastic composition according to any of Aspects 1 to 7, wherein the composition has a tensile elongation at break, as measured in accordance with ASTM D638, that is at least 400% higher than that of a substantially identical reference composition comprising PMMA instead of the poly(carbonate-siloxane) copolymer.

Aspect 9. The thermoplastic composition according to any of Aspects 1 to 8, wherein the composition further comprises one or more additional additives.

Aspect 10. The thermoplastic composition according to Aspect 9, wherein the one or more additional additives is selected from the group consisting of a scratch-resistance agent; a filler; a pigment; a whitening agent; an optical brightener; a surfactant; a processing aid; a thermal stabilizer; a UV stabilizer, a photochemical stabilizer; and combinations thereof.

Aspect 11. The thermoplastic composition according to Aspect 9 or 10, wherein the composition comprises from about 0.05 wt % to about 1 wt % of a thermal stabilizer.

Aspect 12. The thermoplastic composition according to any of Aspects 9 to 11, wherein the composition comprises from about 0.05 wt % to about 1 wt % of a UV stabilizer.

Aspect 13. A film comprising at least one film layer, wherein the at least one film layer comprises the thermoplastic composition according to any of Aspects 1 to 12.

Aspect 14. The film according to Aspect 13, wherein the film comprises at least a second film layer, wherein the second film layer comprises a scratch-resistant hard coat.

Aspect 15. An article comprising the thermoplastic composition or film according to any of Aspects 1 to 14.

Aspect 16. The article according to Aspect 15, wherein the article is an automotive component.

Aspect 17. The article according to Aspect 15, wherein the article is a component of a consumer product.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The Erichsen scratch hardness test method was used to measure surface scratch resistance; this process is widely used in industries relating to manufacture of plastic panels. The method utilizes a diamond or carbide scratching tip. The applied force can range from 0.1 to 10 Newtons (N). As shown in FIG. 1, more pronounced scratches are obtained as the load is increased from 1N to 4N to 8N. A profilometer is used to measure the depth of the scratches in microns. There are two options in that measurement: depth from the peak, and depth from the surface. For the examples described herein, depth from the surface was used.

Figure 2B:
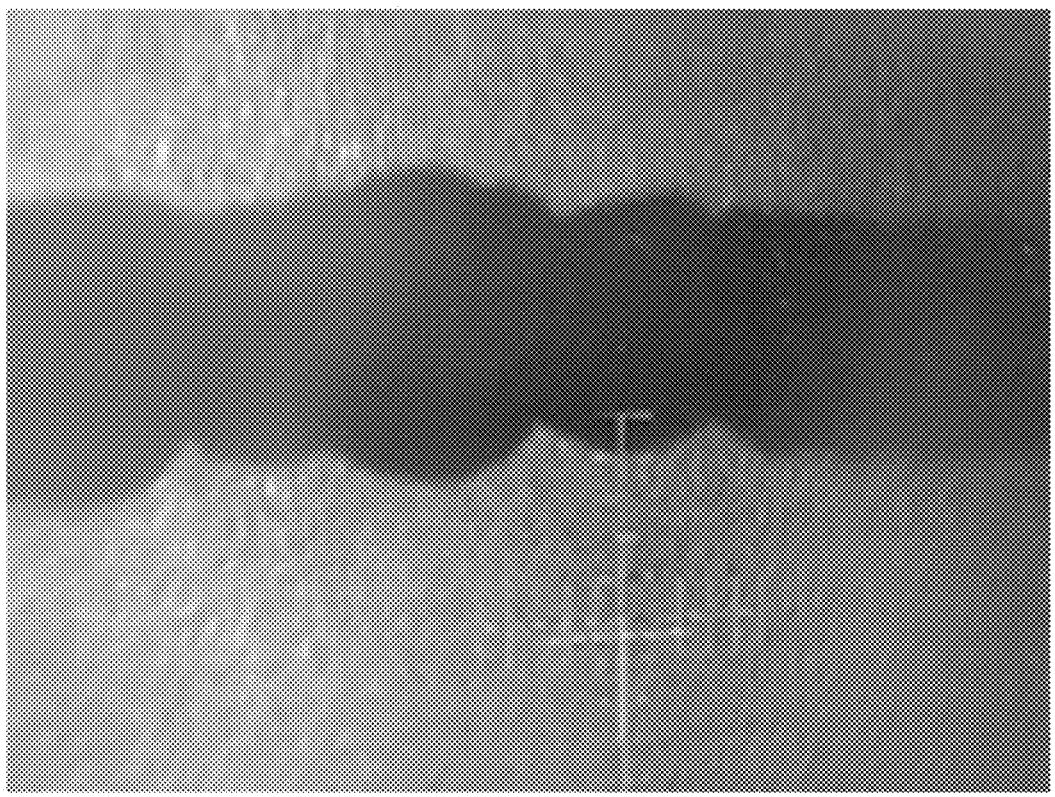
FIGS. 2A and 2B are magnified images showing smooth and rough scratches resulting from the Erichsen scratch resistance test method.
Figure 2A:
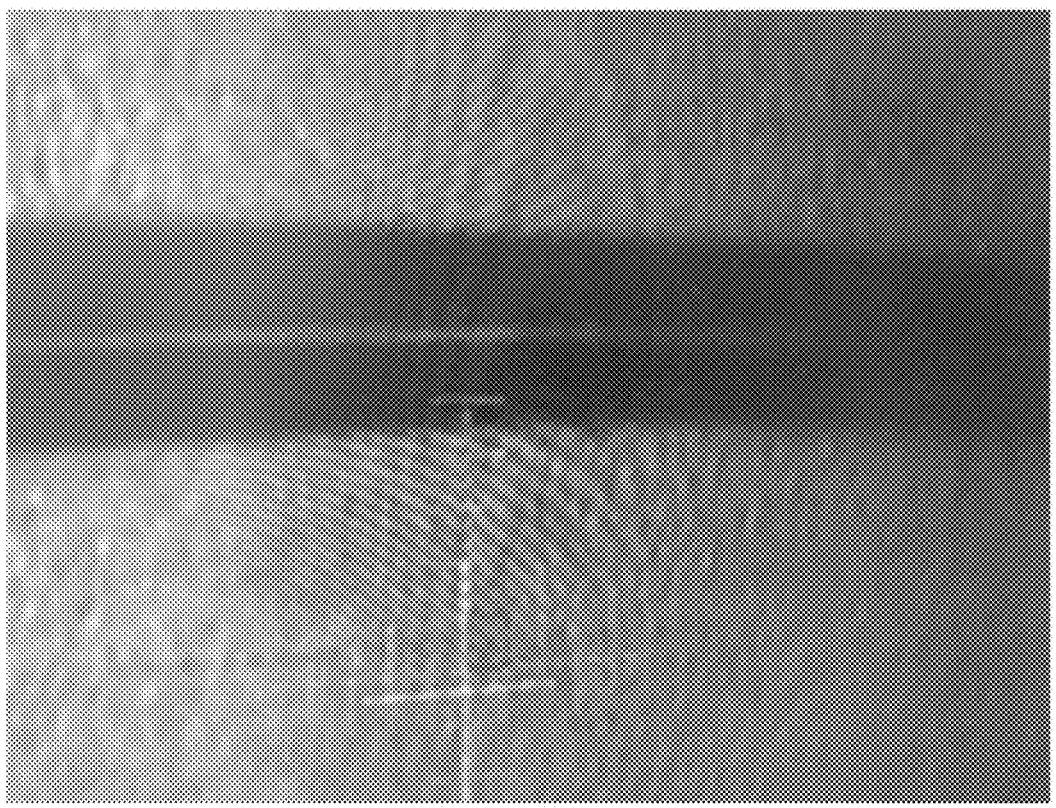

At the lower forces, 1N and 4N respectively, the scratches are smooth (see FIG. 2A). At the 8N force (close to the upper test capability limit of 10N), a rough scratch is obtained (see FIG. 2B). These rough scratches are more difficult to quantify and are more representative of chipping or "gouging." As a result, only data measured at 1N and 4N was assumed to represent scratching.

Compositions were prepared and tested in accordance with Tables 1A and 1B:

TABLE 1A

Compositions and Properties

| Item Description | Unit | C1 | Ex1 | Ex2 | Ex3 | Ex4 |
|---|---|---|---|---|---|---|
| PMMA, Plexiglass V920A | % | 99.6 | 94.6 | 94.6 | 80.8 | 80.8 |
| PC-Si Copolymer (40% Si content) (ML7698, SABIC) | % | 0 | 5.0 | 5.0 | 18.8 | 18.8 |
| Hindered Phenol Stabilizer | % | 0.3 | 0.3 | 0.3 | 0.3 | 0.3 |
| Phosphite Stabilizer | % | 0.1 | 0.1 | 0.1 | 0.1 | 0.1 |
| Formulation Total Properties | % | 100 | 100 | 100 | 100 | 100 |
| Erichsen 1N | μm | 0.8 | 0.6 | 0.5 | 1.3 | 1.6 |
| Erichsen 4N | μm | 13 | 4.7 | 4.0 | 19 | 21 |
| % Transmission - Avg | % | 91 | 86 | | 84 | |
| Notched Izod Impact, ASTM D256, ASTM D4812, 23° C., 5 lbf/ft pendulum energy | J/m | 24 | 44 | | 46 | |
| Improvement vs. PMMA (C1) | % | — | 182 | | 188 | |
| Tensile Modulus of Elasticity - ASTM D638 | MPa | 3186 | 3182 | | 2148 | |
| Tensile Strength at Yield - ASTM D638 | MPa | 71 | 76 | | 44 | |
| Tensile Strength at Break - ASTM D638 | MPa | 69 | 73 | | 43 | |
| % Elongation at Yield - ASTM D638 | % | 5.9 | 5.7 | | 3.4 | |
| % Elongation at Break - ASTM D638 | % | 7.0 | 8.4 | | 24 | |
| Improvement vs. PMMA (C1) | % | — | 119 | | 346 | |
| Heat deflection temperature (HDT), ASTM D648, 0.455 MPa stress, 3.2 mm plaque | ° C. | 93 | 94 | | 87 | |
| HDT, ASTM D648, 1.82 MPa stress, 3.2 mm plaque | ° C. | 79 | | | 75 | |
| VICAT softening temperature (VST), ASTM D1525, 10N load, 120° C./h rate | ° C. | 110 | | | 105 | |
| Melt Mass-flow Rate (MFR), ASTM D1238, 1.2 Kg load, 360 s dwell | g/10 min | 3.7 | | | 33 | |
| Temperature | ° C. | 240 | | | 300 | |

TABLE 1B

Compositions and Properties

| Item Description | Unit | Ex5 | Ex6 | C2 | C3 |
|---|---|---|---|---|---|
| PMMA, Plexiglass V920A | % | 77.1 | 68.0 | 59.6 | 54.6 |
| PC-Si Copolymer (40% Si content) (ML7698, SABIC) | % | 22.5 | 31.6 | 40 | 45 |
| Hindered Phenol Stabilizer | % | 0.3 | 0.3 | 0.3 | 0.3 |
| Phosphite Stabilizer | % | 0.1 | 0.1 | 0.1 | 0.1 |
| Formulation Total Properties | % | 100 | 100 | 100 | 100 |
| Erichsen 1N | μm | 1.5 | 2.1 | 3.8 | 4.1 |
| Erichsen 4N | μm | 17 | 11 | 22 | 28 |
| % Transmission - Avg | % | 85 | 78 | 80 | 76 |
| Notched Izod Impact, ASTM D256, ASTM D4812, 23° C., 5 lbf/ft pendulum energy | J/m | 84 | 87 | 120 | 148 |
| Improvement vs. PMMA (C1) | % | 345 | 358 | 496 | 612 |
| Tensile Modulus of Elasticity - ASTM D638 | MPa | 2416 | 1796 | 2000 | 1504 |
| Tensile Strength at Yield - ASTM D638 | MPa | 53 | 41 | 45 | 36 |
| Tensile Strength at Break - ASTM D638 | MPa | 44 | 37 | 38 | 35 |
| % Elongation at Yield - ASTM D638 | % | 5.4 | 4.9 | 53.8 | 5.9 |
| % Elongation at Break - ASTM D638 | % | 24 | 54 | 28 | 75 |
| Improvement vs. PMMA (C1) | % | 337 | 761 | 404 | 1068 |
| Heat deflection temperature (HDT), ASTM D648, 0.455 MPa stress, 3.2 mm plaque | ° C. | 93 | 89 | 95 | 91 |
| HDT, ASTM D648, 1.82 MPa stress, 3.2 mm plaque | ° C. | | 75 | | 79 |
| VICAT softening temperature (VST), ASTM D1525, 10N load, 120° C./h rate | ° C. | | 110 | | 113 |
| Melt Mass-flow Rate (MFR), ASTM D1238, 1.2 Kg load, 360 s dwell | g/10 min | | 15 | | 8.4 |
| Temperature | ° C. | | 300 | | 300 |

As shown, scratch depth at a 1N force increased slightly with increasing PC—Si copolymer content, but remained less than 3.8 μm at PC-Si copolymer levels of up but not including 40 wt %. For the 4N force, scratch depth was generally less than 20 μm at PC-Si copolymer levels of up to but not including 40 wt %. 4N scratch depth results were particularly good—and even below that of the PMMA control (C1)—at lower PC—Si copolymer levels (below 18 wt %, see Ex1 and Ex2).

Tables 1A and 1B show that all of the materials tested had very good transparency (values well over 70% transmission). The introduction of the PC—Si copolymer significantly improved the notched Izod impact strength and the tensile elongation at break. Nominal changes were observed from the three heat resistance tests, which is not necessarily surprising because the heat characteristics of PMMA and the PC—Si copolymer are similar.

Tensile modulus was significantly reduced by the introduction of the PC—Si copolymer into the composition. Even at the highest PC—Si copolymer content, however, this tensile modulus is in the range of thermoplastic materials rather than elastomeric materials.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

The invention claimed is:

1. A thermoplastic composition comprising:
   from about 62 wt % to about 99 wt % poly(methyl methacrylate) (PMMA) or copolymers thereof; and
   from about 1 wt % to about 38 wt % of a poly(carbonate-siloxane) copolymer having a siloxane content of from about 25 wt % to about 45 wt %,
   wherein the composition is scratch resistant.

2. The thermoplastic composition according to claim 1, wherein the poly(carbonate-siloxane) copolymer has a siloxane content of about 40 wt %.

3. The thermoplastic composition according to claim 1, wherein the composition has a transmittance of at least 70% as measured in accordance with ASTM D1003.

4. The thermoplastic composition according to claim 1, wherein the scratch resistance is determined as comprising a scratch depth of less than 20 micron (μm) as measured in accordance with the Erichsen scratch hardness test at a force of 4 Newton (N).

5. The thermoplastic composition according to claim 1, wherein the composition comprises from about 82 wt % to about 99 wt % PMMA and from about 1 wt % to about 18 wt % poly(carbonate-siloxane) copolymer, and wherein the scratch resistance is determined as comprising a scratch depth of less than 5 μm as measured in accordance with the Erichsen scratch hardness test at a force of 4N.

6. The thermoplastic composition according to claim 1, wherein the composition comprises from about 62 wt % to about 77 wt % PMMA or copolymers thereof and from about 23 wt % to about 38 wt % poly(carbonate-siloxane) copolymer.

7. The thermoplastic composition according to claim 1, wherein the composition has a notched Izod impact strength at 23° C., as measured in accordance with ASTM D256 and ASTM D4812, that is at least 200% higher than that of a substantially identical reference composition comprising PMMA instead of the poly(carbonate-siloxane) copolymer.

8. The thermoplastic composition according to claim 1, wherein the composition has a tensile elongation at break, as measured in accordance with ASTM D638, that is at least 400% higher than that of a substantially identical reference composition comprising PMMA instead of the poly(carbonate-siloxane) copolymer.

9. The thermoplastic composition according to claim 1, wherein the composition further comprises one or more additional additives.

10. The thermoplastic composition according to claim 9, wherein the one or more additional additives is selected from the group consisting of: a scratch-resistance agent; a filler; a pigment; a whitening agent; an optical brightener; a surfactant; a processing aid; a heat stabilizer; a UV stabilizer; a photochemical stabilizer; and combinations thereof.

11. A film comprising at least one film layer, wherein the at least one film layer comprises the thermoplastic composition according to claim 1.

12. The film according to claim 11, wherein the film comprises at least a second film layer, wherein the second film layer comprises a scratch-resistant hard coat.

13. An article comprising the thermoplastic composition or film according to claim 1.

14. The article according to claim 13, wherein the article is an automotive component.

15. The article according to claim 13, wherein the article is a component of a consumer product.

* * * * *